(12) United States Patent
Petrescu et al.

(10) Patent No.: US 7,899,988 B2
(45) Date of Patent: Mar. 1, 2011

(54) VIDEO MEDIA DATA STORAGE SYSTEM AND RELATED METHODS

(75) Inventors: Mihai G. Petrescu, North Hollywood, CA (US); Hilton S. Creve, Culver City, CA (US); Tung M. Tran, West Hills, CA (US); Todd S. Roth, Sunland, CA (US); Theodore H. Korte, Granada Hills, CA (US)

(73) Assignee: Harris Corporation, Melbourne, FL (US)

( * ) Notice: Subject to any disclaimer, the term of this patent is extended or adjusted under 35 U.S.C. 154(b) by 420 days.

(21) Appl. No.: 12/039,129

(22) Filed: Feb. 28, 2008

(65) Prior Publication Data

US 2009/0222622 A1 Sep. 3, 2009

(51) Int. Cl.
*G06F 12/00* (2006.01)
*G06F 13/00* (2006.01)

(52) U.S. Cl. .................. 711/114; 711/100; 711/112; 711/113; 711/154

(58) Field of Classification Search ................ 711/111, 711/100, 112, 113, 114, 154
See application file for complete search history.

(56) References Cited

U.S. PATENT DOCUMENTS

| | | | |
|---|---|---|---|
| 6,160,547 A | 12/2000 | Roth | 345/328 |
| 6,223,252 B1* | 4/2001 | Bandera et al. | 711/114 |
| 6,414,725 B1 | 7/2002 | Clarin et al. | 348/714 |
| 6,480,970 B1* | 11/2002 | DeKoning et al. | 714/6 |
| 6,892,167 B2 | 5/2005 | Polan et al. | 702/187 |
| 7,143,249 B2 | 11/2006 | Strange et al. | 711/162 |
| 7,225,315 B2 | 5/2007 | Liu et al. | 711/170 |
| 7,266,637 B1 | 9/2007 | Van Rietschote | 711/112 |
| 7,299,290 B2 | 11/2007 | Karpoff | 709/231 |
| 2003/0084242 A1* | 5/2003 | Strange et al. | 711/114 |
| 2006/0020664 A1 | 1/2006 | Umeda | 709/203 |
| 2006/0112219 A1* | 5/2006 | Chawla et al. | 711/114 |
| 2006/0129614 A1 | 6/2006 | Kim et al. | 707/202 |
| 2006/0136778 A1* | 6/2006 | Graverand et al. | 714/6 |
| 2006/0215700 A1* | 9/2006 | Zayas | 370/474 |
| 2007/0153906 A1* | 7/2007 | Petrescu et al. | 375/240.24 |

OTHER PUBLICATIONS

Optimal Data Allotment to Build High Availability and High Performance Disk Arrays NN940575; IBM Technical Disclosure Bulletin; May 1, 1994.*

(Continued)

*Primary Examiner*—Tuan V. Thai
(74) *Attorney, Agent, or Firm*—Allen, Dyer, Doppelt, Milbrath & Gilchrist, P.A.

(57) ABSTRACT

A video media data storage system may include first and second pluralities of data storage devices each arranged in a redundant array of independent drives (RAID) configuration for permitting writing and reading of video media data. The system may further include at least one memory controller coupled to the first and second pluralities of data storage devices for performing mirrored writing of video media data to both the first and second pluralities of data storage devices. The at least one memory controller may also be for generating respective first and second file allocation tables (FATs) including video media data time stamps and validity information for both of the first and second pluralities of data storage devices, and selectively reading video media data from the first and second pluralities of data storage devices based upon the first and second FATs.

23 Claims, 14 Drawing Sheets

OTHER PUBLICATIONS

Hybrid Redundancy Direct-Access Storage Device Array with Design Option NB9402141; IBM Technical Disclosure Bulletin; Feb. 1994.*
Definition of video; Free Online Dictionary of Computing.*
NEXIO AMP; Harris Corporation; copyright 2007.*
Leitch Introduces VR400 MPEG-2 Server; Business Wire; Mar. 17, 1999.*
Leitch Technology Corporation Investor Presentation; Aug. 2004.*
The Nexio XS Server System; Harris Corporation; copyright 2007.*
Harris Corporation Announces Launch of Leitch NEXIO XS SD/HD Server System; Harris Corporation; Apr. 4, 2006.*
Raidsoft; Schultz, Fred; Jun. 20, 2000.*
NEXIO Server System for Your Integrated Content Environment; Harris Corporation; copyright 2003.*
Definition of data; Free Online Dictionary of Computing.*
RAIDsoft: An Innovative Distributed Software RAID which Protects Broadcast Video Server Customers against Multiple Disk Drive Failures; Leitch Server Group; Sep. 1997.*
Harris Corporation Launches Next-Generation NEXIO AMP Advanced Media Platform, News Release, Sep. 6, 2007.
Nexio Amp, Advanced Media Platform, Harris Corporation, 2007.
U.S. Appl. No. 11/675,556, filed Feb. 15, 2007, Petrescu.

* cited by examiner

FAT 1

| 1<br>D1 OK<br>D2 OK<br>TS=t1 | 2<br>D1 OK<br>D2 BAD<br>TS=t2 | 3<br>D1 OK<br>D2 OK<br>TS=t3 | 4<br>D1 OK<br>D2 OK<br>TS=t4 | 5<br>D1 OK<br>D2 OK<br>TS=t5 |
|---|---|---|---|---|
| 6<br>D1 OK<br>D2 OK<br>TS=t6 | 7<br>D1 OK<br>D2 OK<br>TS=t7 | 8<br>D1 OK<br>D2 OK<br>TS=t8 | 9<br>D1 OK<br>D2 OK<br>TS=t9 | 10<br>D1 OK<br>D2 OK<br>TS=t10 |

FIG. 8A

| 1<br>D1 OK<br>D2 OK<br>TS=r1 | 2<br>D1 OK<br>D2 OK<br>TS=r2 | 3<br>D1 OK<br>D2 OK<br>TS=r3 | 4<br>D1 BAD<br>D2 OK<br>TS=r4 | 5<br>D1 OK<br>D2 OK<br>TS=r5 |
|---|---|---|---|---|
| 6<br>D1 OK<br>D2 OK<br>TS=r6 | 7<br>D1 BAD<br>D2 OK<br>TS=r7 | 8<br>D1 OK<br>D2 OK<br>TS=r8 | 9<br>D1 OK<br>D2 OK<br>TS=r9 | 10<br>D1 OK<br>D2 OK<br>TS=r10 |

FAT 2

FIG. 8B

OPERATION TABLE

| | CHECK D1 FROM FAT1 | CHECK D2 FROM FAT2 | COMPARE TIMES | RESULT | ACTION |
|---|---|---|---|---|---|
| READ BLOCK 1 | D1 OK \| D1 OK= OK | D2 OK \| D2 OK= OK | t1 = r1 | BOTH DATA STRIPES VALID | READ D1 OR D2 |
| READ BLOCK 2 | D1 OK \| D1 OK= OK | D2 OK \| D2 BAD= BAD | t2 > r2 | DATA STRIPE 1 VALID, DATA STRIPE 2 BAD | READ D1 |
| READ BLOCK 4 | D1 OK \| D1 BAD= BAD | D2 OK \| D2 OK= OK | t4 < r4 | DATA STRIPE 1 BAD, DATA STRIPE 2 VALID | READ D2 |
| READ BLOCK 7 | D1 OK \| D1 OK= OK | D2 OK \| D2 OK= OK | t7 < r7 | DATA STRIPE 1 OLD, DATA STRIPE 2 VALID- | READ D2 |
| READ BLOCK 9 | D1 OK \| D1 OK= OK | D2 OK \| D2 OK= OK | t9 > r9 | DATA STRIPE 1 VALID, DATA STRIPE 2 OLD- | READ D1 |

FIG. 8C

VIDEO MEDIA DATA STORAGE SYSTEM AND RELATED METHODS

FIELD OF THE INVENTION

The present invention relates to the field of data storage, and, more particularly, to video data storage networks and related methods.

BACKGROUND OF THE INVENTION

In the computer industry the term "crash" is defined as the sudden failure of a software application or operating system, or of a hardware device such as a hard disk. While a software crash usually creates an interruption in service, the dreaded hard disk crash also tends to cause the loss of data. Due to the mechanical nature of a fast-spinning disk drive (e.g., 10,000 RPM), crashes are usually permanent and the need for data protection becomes critical.

Along with data errors that occur due to outright drive failure, expressed as a mean time between failure (MTBF), drives also experience bit errors over the amount of data read, expressed as a bit error rate (BER). Other errors that can result in seek, read and write failures are usually masked by successful retries. Since many drives now come with MTBF's upward of one million hours, BER's on the order of 1 in $1 \times 10^{15}$ and warranties up to 5 years, it makes economic sense for the vendors to be able to distinguish between a drive that has failed from one that is merely "having occasional trouble." To reduce warranty replacement costs, drives hedge against excessive "failures" by employing many internal data recovery mechanisms, including error correction, retries, and sector remapping. Only when a drive exceeds its retry count and runs out of sectors for remapping is it considered "failed."

Because of the need for deterministic data performance, video server designs usually cannot afford to allow drives the luxury to attempt all of the internal data correction mechanisms designed to conceal errors. Retries need to be limited and managed at a systemic level, and problematic drives generally are not acceptable.

Drive specifications also typically specify an annualized failure rate (AFR), which is equal to the operational duty cycle multiplied by the number of hours in a year and divided by the MTBF. Drives are usually divided into 3 classes, namely desktop, notebook and enterprise. Although more costly, only enterprise or server class drives are specified around a 100% duty cycle. So, a server drive with an MTBF of 1,000,000 hours would have an AFR of 0.876%, while a drive with an MTBF of 1,500,000 hours would have an AFR of 0.584%.

As systems increase in performance, size, and complexity, drive failure and error handling become a critical issue to video server design. Assuming a drive has a BER of 1 per $1 \times 10^{15}$ (errors per bits read), as data rates increase, the error frequency approaches 1 every few hours. Since even a single uncorrected bit error in a critical data location may result in an unacceptable video anomaly, it is typically necessary to implement some form of data protection.

One disk drive configuration that is used to help guard against data loss is the redundant array of independent drives (RAID) configuration. Generally speaking, in a RAID data is divided and/or replicated among multiple hard disk drives, which can lead to increased data reliability as well as increased input/output (I/O) performance.

Various levels of RAID configurations have been developed, and different RAID levels take advantage of different storage/data protection techniques. For example, some RAIDs employ "striping," meaning that the data stream is divided into segments or blocks that are stored on separate drives in the RAID. Parity data may be used with data striping, which allows data from a faulty drive or sector(s) to be reconstructed from data on the other data drives in the RAID and the parity data. Another RAID technique is mirroring data on multiple drives within a same RAID set. That is, a copy of a data set is stored/maintained on a separate drive so that if one of the drives goes down, the duplicate data set is immediately available from the mirror drive.

Various prior art RAID implementations have been used to provide increased read performance and data redundancy. By way of example, U.S. Pat. No. 7,225,315 is directed to a file system including a storage system having a plurality of volumes, a volume allocation table adapted to set the plurality of volumes for each directory, a file allocation table that stores attributes and divided block information of the file, a block reading table in which numbers of blocks read out in one reading operation for each volume are respectively set, and a read control module that controls data read from the volume. A read control module, when a read command is received, determines a volume to be read from the volume allocation table. The read control module further determines the number of blocks read for each volume by referring to the block reading table, determines the blocks read for each volume based on the volume, the number of blocks, and the block information, and reads from each volume in parallel.

Despite the advantages that such configurations provide in certain applications, further data reading and recovery features may be desirable in high-bandwidth, high-reliability data storage applications, such as broadcast video applications, for example.

SUMMARY OF THE INVENTION

In view of the foregoing background, it is therefore an object of the present invention to provide a system and related methods for enhanced video media data storage and recovery.

This and other objects, features, and advantages are provided by a video media data storage system which may include first and second pluralities of data storage devices each arranged in a redundant array of independent drives (RAID) configuration for permitting writing and reading of video media data. The system may further include at least one memory controller coupled to the first and second pluralities of data storage devices for performing mirrored writing of video media data to both the first and second pluralities of data storage devices. The at least one memory controller may also be for generating respective first and second file allocation tables (FATs) including video media data time stamps and validity information for both of the first and second pluralities of data storage devices, and selectively reading video media data from the first and second pluralities of data storage devices based upon the first and second FATs. As such, more flexibility in video media data reading is provided to therefore enhance performance.

In addition, the at least one memory controller may also be for performing data recovery between the first and second plurality of data storage devices from the mirrored video media data based upon the first and second FATs. Moreover, the at least one memory controller may write the video media data in each of the first and second pluralities of data storage devices as striped video media data, and generate parity data from the striped video media. The at least one memory controller may therefore also perform data recovery within a given one of the first and second pluralities of data storage devices based upon the parity data. Additionally, the at least one memory controller may also advantageously select between using the mirrored video media data and the parity data for performing data recovery based upon a number of data storage devices having faults within the given one of the first and second pluralities of data storage devices.

The validity information may include data storage device fault information, for example. As such, the at least one memory controller may give reading preference to data storage devices without a fault and with a most recent video media data time stamp. The at least one memory controller may also perform load balancing for reading the video media data from the first and second pluralities of data storage devices.

By way of example, the first and second pluralities of data storage devices may each be arranged in a RAID 3 or higher configuration. Furthermore, the at least one memory controller may include a first memory controller for the first plurality of data storage devices, and a second memory controller for the second plurality of data storage devices. Additionally, the system may further include first and second fibre channel (FC) switches respectively coupling the first and second memory controllers to the first and second pluralities of data storage devices. Also, the first memory controller may be coupled to the second FC switch, and the second memory controller may be coupled to the first FC switch.

The first and second pluralities of data storage devices and the at least one memory controller may be connected together in a storage area network (SAN), for example. Further, the at least one memory controller may be at least one broadcast video server.

A video media data storage method aspect may include providing first and second pluralities of data storage devices each arranged in a redundant array of independent drives (RAID) configuration for permitting writing and reading of video media data, and performing mirrored writing of video media data to both the first and second pluralities of data storage devices. The method may further include generating respective first and second file allocation tables (FATs) including video media data time stamps and validity information for both of the first and second pluralities of data storage devices. The method may also include selectively reading video media data from the first and second pluralities of data storage devices based upon the first and second FATs.

BRIEF DESCRIPTION OF THE DRAWINGS

FIGS. 8A and 8B are respective FAT tables for the first and second pluralities of data storage devices of the system of FIG. 1, and FIG. 8C is a corresponding operation table showing read operations by the memory controller(s) of the system of FIG. 1 based upon the information in the FAT tables of FIGS. 8A and 8B.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
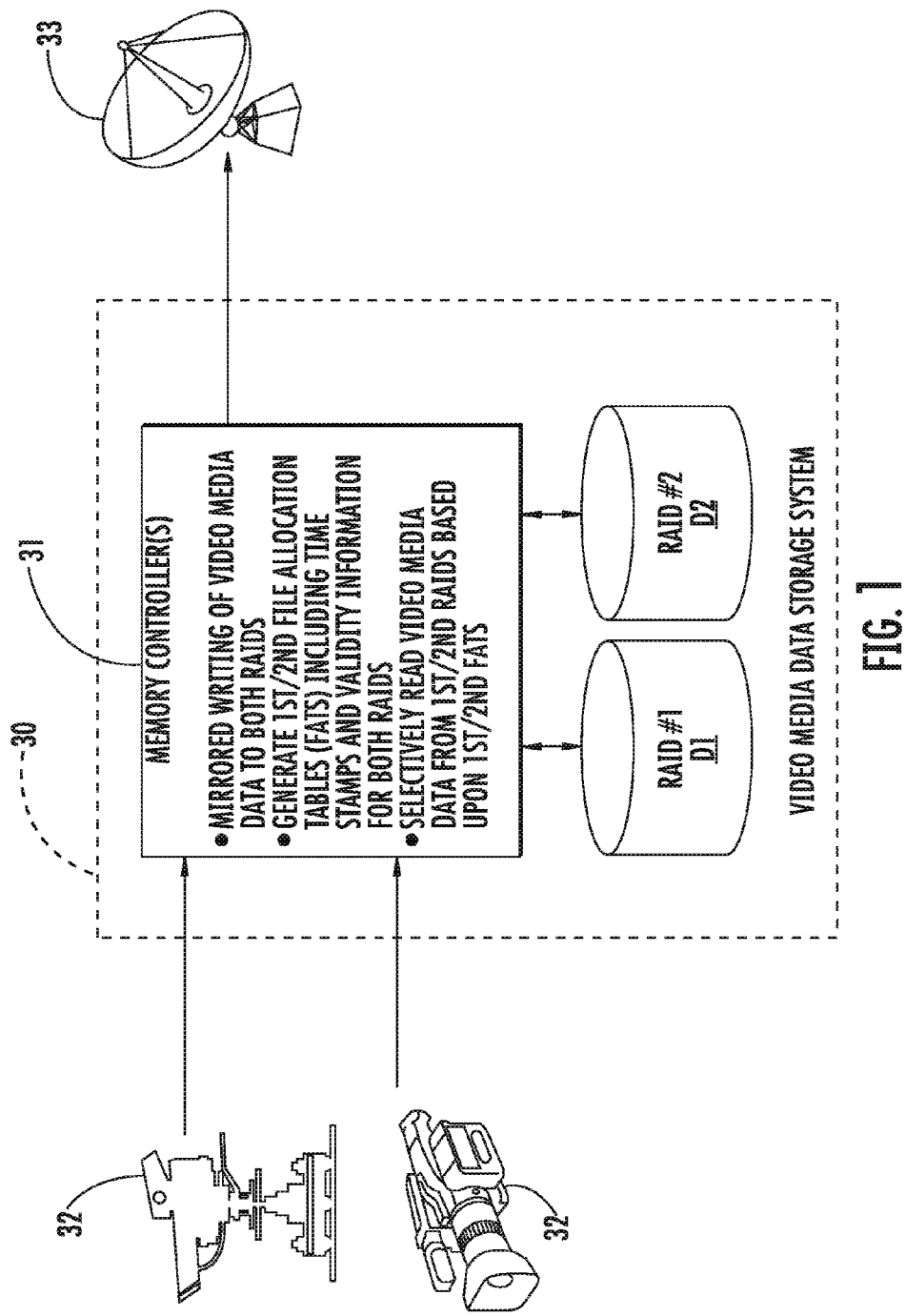
FIG. 1 is a schematic block diagram of a video media data storage system in accordance with the invention.

Referring initially to FIG. 1, a video media data storage system 30 and associated video data storage method are first described. The system 30 illustratively includes first and second pluralities or sets of data storage devices D1 and D2 each arranged in a redundant array of independent drives (RAID) configuration for permitting writing and reading of video media data. As used herein, "video media data" includes video, graphics, automation and/or animation, and associated audio data, for example. Furthermore, one or more memory controllers 31 are illustratively coupled to the first and second RAID sets D1, D2. In a typical implementation, the data storage devices may be magnetic or optical disks, although other suitable data storage devices (e.g., FLASH drives, etc.), may also be used.

The system 30 may be particularly well suited for applications where a large bandwidth is required, such as in broadcast or streaming video data applications. In the illustrated example, the video data feed is generated by video cameras 32, and video media data from the system 30 may be communicated to recipients by one or more communications mediums, such as a satellite link (illustrated by a satellite station 33 in FIG. 1), co-axial/fiber connections, wide area networks (WANs) such as the Internet, etc., as will be appreciated by those skilled in the art.

Figure 3:
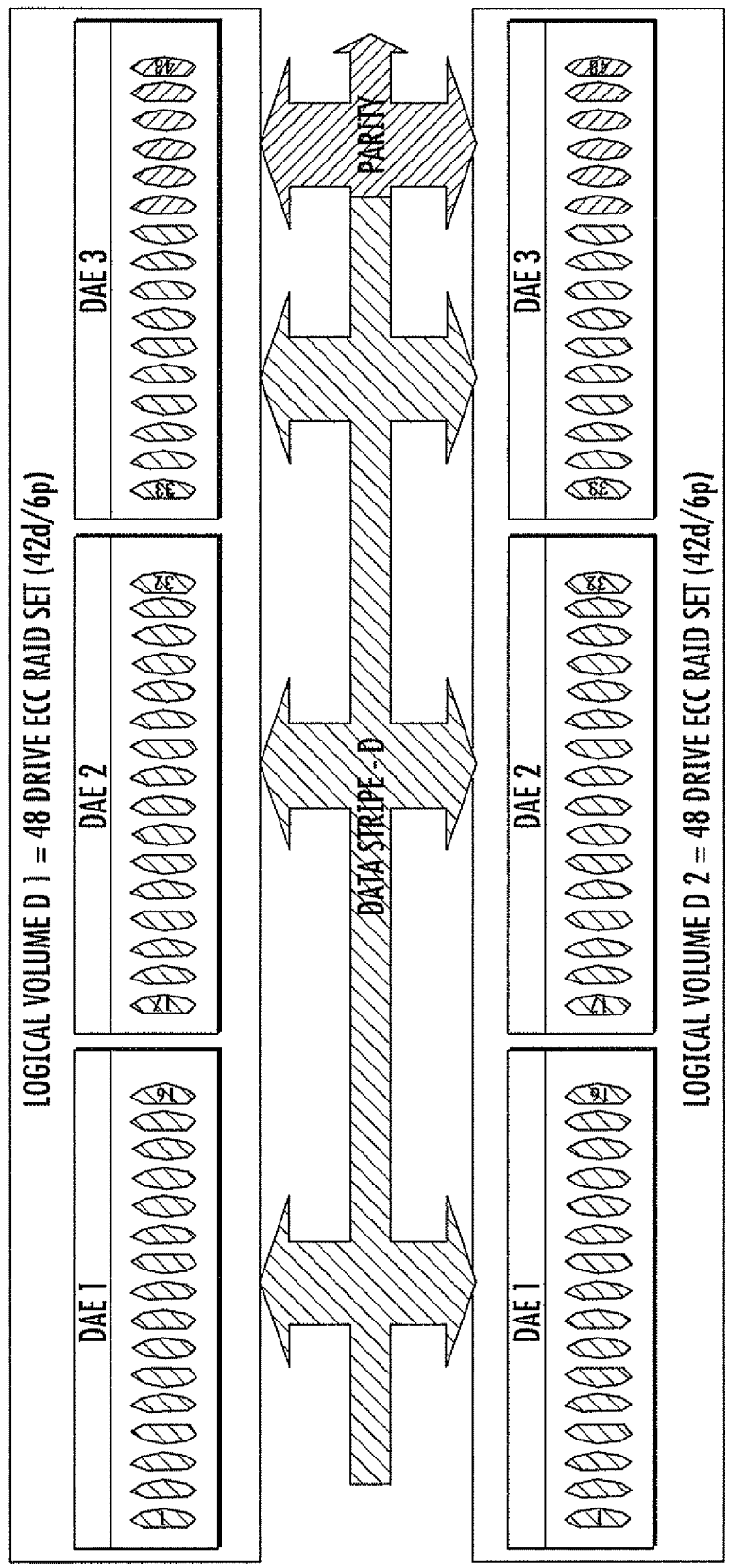
FIG. 3 is a RAID map of the mirrored RAID sets of FIG. 1 illustrating mirrored writing thereto.
Figure 14:
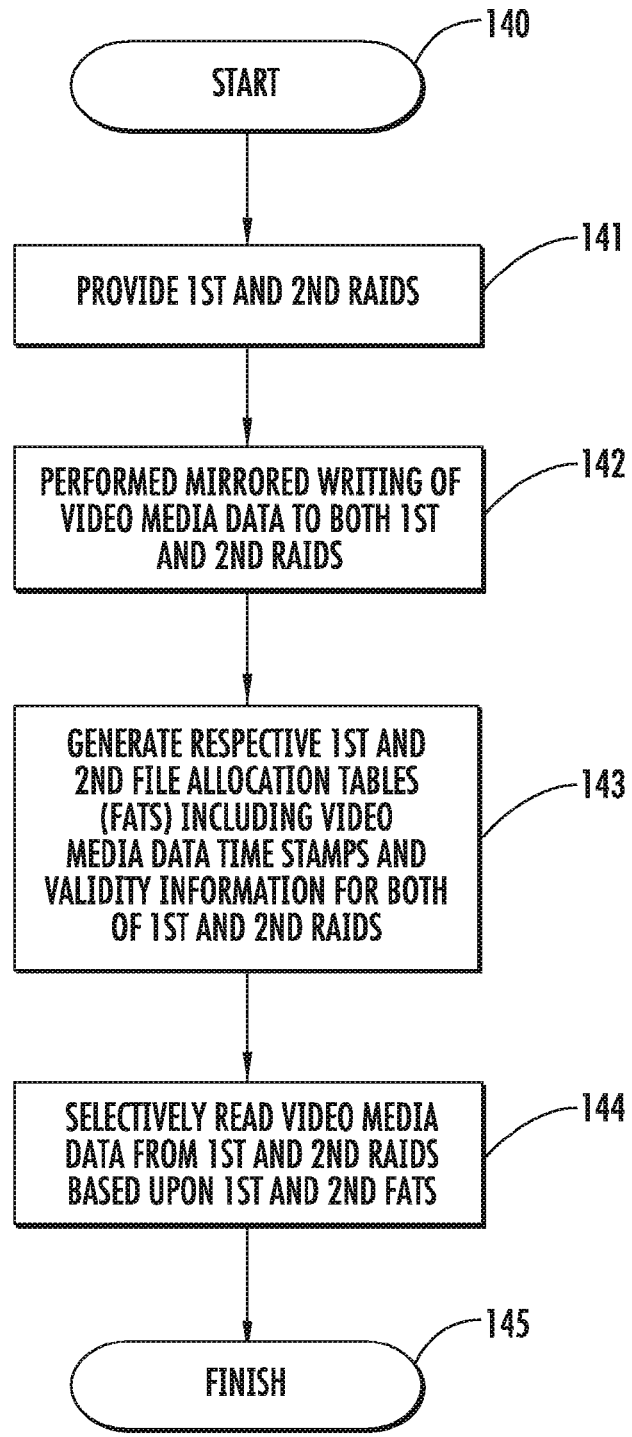
FIG. 14 is a flow diagram generally illustrating reading and writing operations in accordance with the invention.
Figure 15:
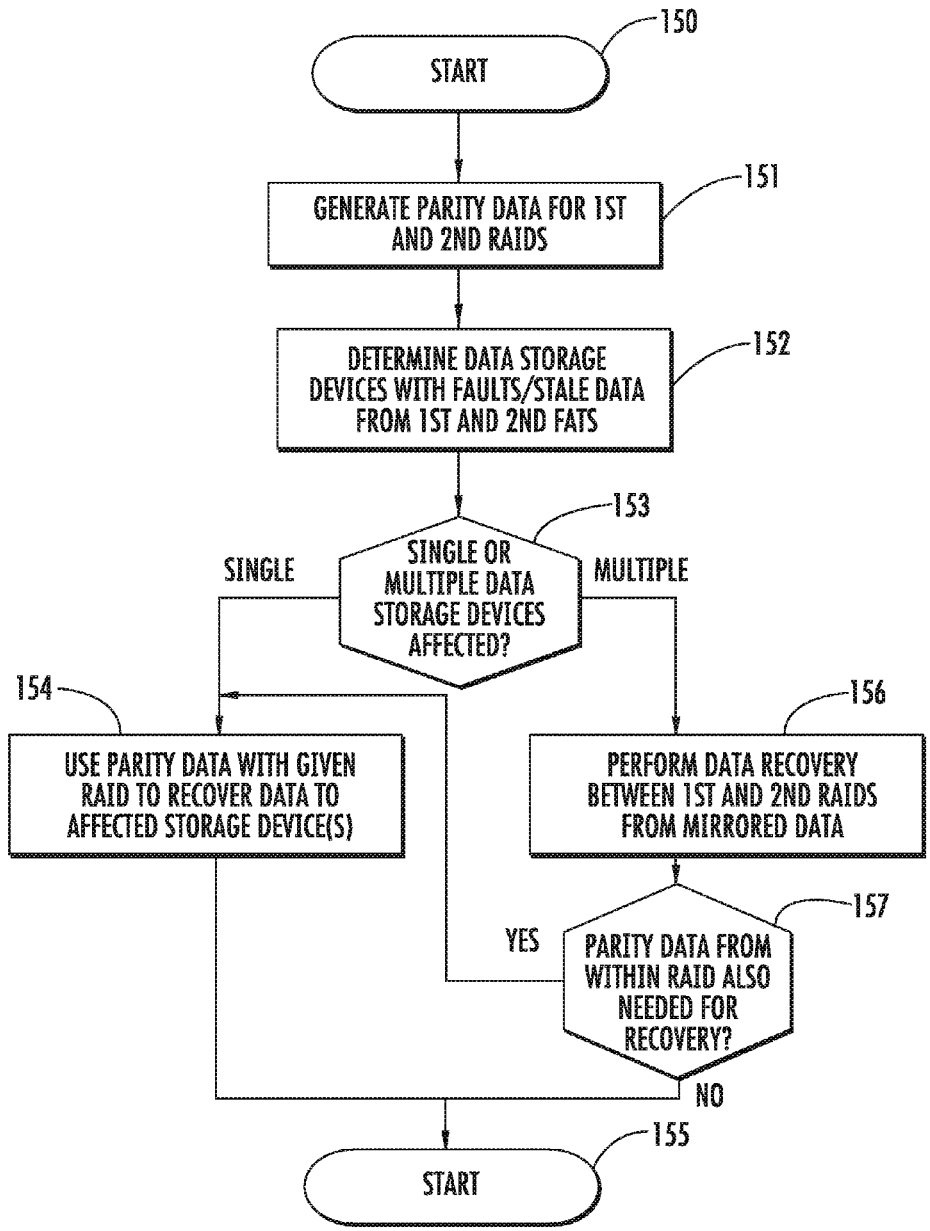
FIG. 15 is flow diagram illustrating data recovery operations in accordance with another advantageous aspect of the invention.

Turning now additionally to FIGS. 3 and 14, beginning at Block 140, writing and reading operations of the system 30 will first be generally described, and further detail will be provided below. The memory controller(s) 31 performs mirrored writing of video media data to both the first and second RAID sets D1, D2 (Blocks 141-142). In one exemplary implementation, the data in a given RAID set D1, D2 is written in data stripes (i.e., divided in blocks or sections each written to a different storage device), and the striped data is mirrored in both of the RAID sets D1, D2, as will be discussed further below. This mirrored data writing is illustrated in FIG. 3.

The memory controller(s) 31 also generates respective first and second file allocation tables (FATs) including video media data time stamps and validity information (e.g., drive/ sector fault information, etc.) for both of the first and second RAID sets D1, D2, at Block 143. Since both of the FATs are available to the memory controller(s) 31, it can advantageously selectively read video media data from the first and second RAID sets D1, D2 based upon the first and second FATs, at Block 144, thus concluding the method illustrated in FIG. 14 (Block 145). That is, the memory controller(s) 31 has more flexibility in performing read operations, which may be particularly important where there are multiple drive faults. For example, the memory controller(s) 31 may give reading preference to data storage devices without a fault and with a most recent video media data time stamp. Moreover, this also advantageously allows load balancing to be used to reduce read times and increase data throughput, for example.

In addition, this configuration also allows the memory controller(s) 31 to perform data recovery between the first and second RAID sets D1, D2 from the mirrored video media data based upon the first and second FATs. Stated alternatively, this allows inter-RAID data recovery (i.e., from RAID set D1 to D2, or vice-versa). More particularly, the memory controller(s) 31 may write the video media data in each of the first and second RAID sets D1, D2 as striped video media data, and generate parity data from the striped video media data to perform data recovery within a given RAID set based thereon (i.e., intra-RAID data recovery), as will be discussed further below. The memory controller(s) 31 will, generally speaking, select between using the mirrored video media data (inter-RAID recovery) and the parity data (intra-RAID recovery) for performing data recovery based upon a number of data storage devices having faults within the first and second RAID sets D1, D2, as will also be discussed further below.

Figure 2:
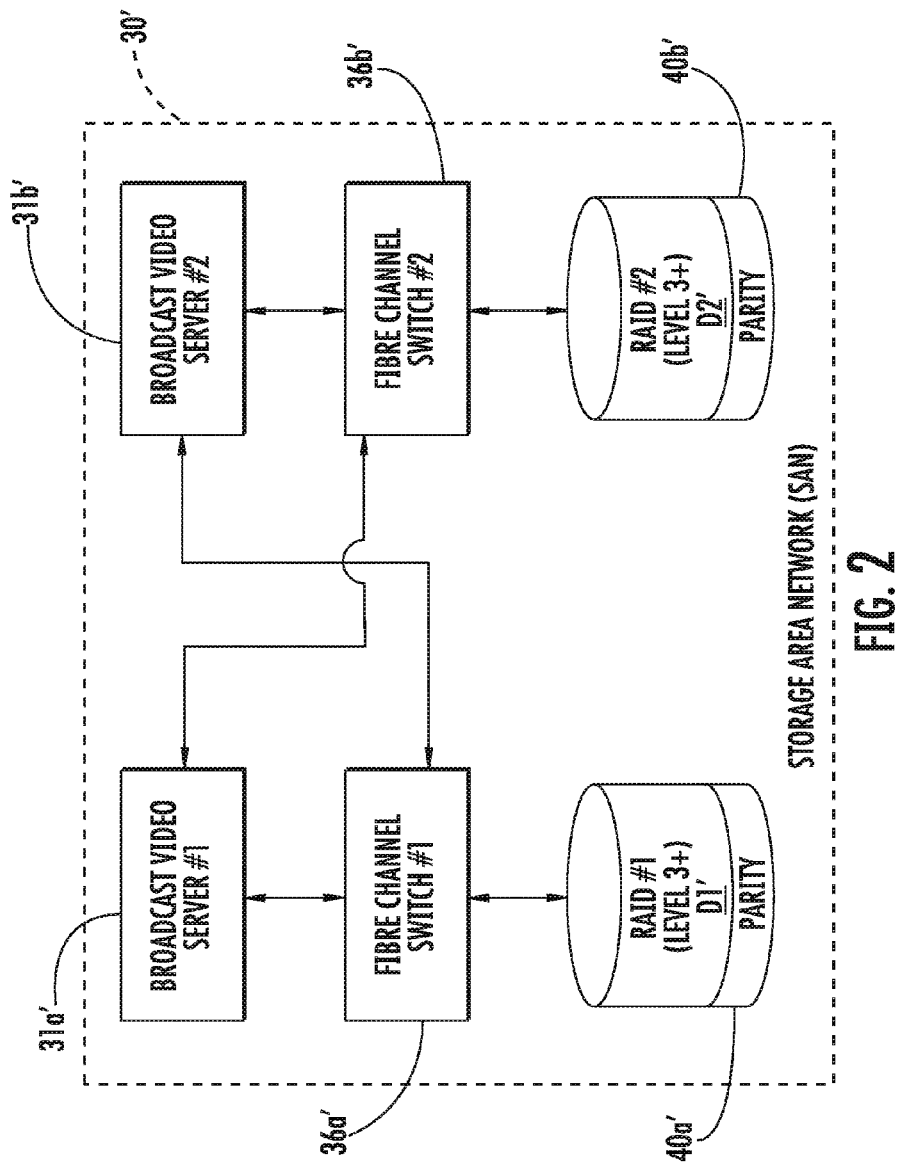
FIG. 2 is a schematic block diagram of an alternative embodiment of the video media data storage system of FIG. 1.

Turning now additionally to FIG. 2, in an alternative embodiment the system 30' is implemented as a storage area network (SAN) and includes respective broadcast video servers as the memory controllers 31a', 31b'. By way of example, one suitable broadcast video server that may be used is the Nexio Advanced Media Platform (AMP) from Harris Corporation, the present Assignee. However, other suitable memory controllers/servers may also be used in different embodiments, as will be appreciated by those skilled in the art.

In the SAN system 30', the first and second RAID sets D1', D2' are arranged in a RAID level 3 (or higher) configuration and implement data striping and parity (e.g., error correction code (ECC) parity), as will be appreciated by those skilled in the art. The parity data is stored in one or more dedicated parity data storage devices 40a', 40b'. Furthermore, first and second fibre channel (FC) switches 36a', 36b' are respectively coupled to the first and second memory controllers 31a', 31b' and the first and second RAID sets D1', D2'. That is, the first and second RAID sets D1', D2' are on separate FC domains to advantageously provide high redundancy and availability, as will be appreciated by those skilled in the art.

Moreover, the first memory controller 31a' is illustratively coupled to the second FC switch 36b', and the second memory controller 31b' is illustratively coupled to the first FC switch 36a'. This advantageously gives the first memory controller 31a' access to the second RAID set D1', and the second memory controller 31b' access to the second RAID set D2'. In some embodiments, additional FC switches may also be used to provide additional access points to the RAID sets D1', D2', for example. However, it should be noted that a SAN and/or FC network configuration is not required in all embodiments.

As noted above, since even a single uncorrected bit error in a critical data location may result in an unacceptable video anomaly, it is generally desired to implement some form of data protection. In a typical RAID 3 implementation, the parity information is simply used to reconstruct errant data after the problem is discovered. However, in the system 30 parity information may be continuously read and decoded, improving the capability of error detection as well as data performance during error correction.

More particularly, intra-RAID set parity may be implemented in the system 30 or 30' as follows. Data is organized into buffers or stripes and is stored on respective drives 1-P, and each partial data block size is defined as:
Data Buffer: D
Partial: d
Parity: P
Buffer size=$S_d$
Partial size: $S_d$
Number of drives=n
Partial size ($s_d$)=$S_d$/n, where $S_d$ is divisible n, and $$D=\Sigma_{i=n}^{i=0}di$$

Representing the XOR contribution of each partial as d, the parity equation is defined as:

$$P=xor\Sigma_{i=n}^{i=0}di$$

A single failing data block derr can be reconstructed via the inverse operation:

$$derr=Pxor(xor\Sigma_{i<err}^{i=0}di+xor\Sigma_{i=n}^{i<err}di)$$

Unlike many RAID 3 implementations, in read mode the memory controllers 31a', 31b' advantageously read the parity data and use it to verify data integrity, rather than simply using this information for after-the-fact data recovery. Since the parity data is typically based on XOR contributions from each partial, error handling can take the form of either detection or correction. In this application, the parity equation serves three purposes depending on the error cases. A first error case is when a partial data block is not returned, or is reported in error. The defective partial is still reconstructed by the XOR resultant of the good partials and the parity. This case is known as single-error correcting (SEC).

A second case is when all partial data and parity is returned and no errors are reported by the drive. If all the data and parity is in fact good, the equation simply rebuilds the buffer. If any partial is detective, the error is detected and the damaged buffer is discarded. For the sake of video (and audio) information, data may be represented as black and silence can be substituted. This case is known as single-error detecting (SED). Still another case is where the partial data set has multiple defective elements. In this eventuality the data cannot be corrected, and again for the sake of video (and audio) information, data may be represented as black and silence can be substituted. This case is known as multiple-error detecting (MED).

In the case of a RAID disk storage sub-system, a failing partial usually represents a specific failing drive (resolving the issue of knowing which partial is in error), which reduces the model to the first and third cases noted above. By relying on the drive to know when it is having a problem and not always running data through XOR verification, most RAID systems typically ignore the second case, leaving the system vulnerable or erroneous unreported data. In the application of a video server, the present approach implemented by the memory controllers 31a', 31b' of using parity data for error detection may potentially detect this erroneous data and replace it with black to maintain a continuous uninterrupted video stream. This same approach may also be used for audio to reduce "pops" and "clicks".

Another advantage of always keeping a running, on the fly, parity count is an overall performance improvement in the case of single corrected errors. If a drive fails, there is no need to go back and re-read the previous partials. Rather, the memory controllers 31$a'$, 31$b'$ may skip over the failed device and reconstruct its data contribution using the accrued parity information. This advantageously results in no net decrease in system performance during a "degraded" mode of operation.

Since a single parity drive RAID can only protect a data stripe from a single data element failure, the odds of an uncorrectable failure increase with the amount of partials involved in the stripe. As more data elements (drives in this case) are added, the greater the likelihood of an uncorrectable double data failure. The primary tradeoff of using a single parity RAID is that as sets grow larger they become much more susceptible to uncorrectable double errors. The system 30' therefore advantageously utilizes multiple, mirrored RAID sets D1', D2' to provide further error recovery flexibility (in addition to the additional data reading flexibility noted above), as will be discussed further below.

An improved approach toward overcoming the deficiencies of single parity block per data stripe can be realized using a multi-parity block approach. The first part of this approach is defining a set of equations to represent parity information of a given data set. Hamming codes are used to define these equations. By using Hamming distance-3 codes to define a set of parity equations, desired data protection of the following nature may be achieved:

Number of parity equations (parity drives): r

Number of partial data blocks (data drives): $n = 2^r - 1 - r$

Examining the example of a typical (15,11,3) code SEC set of Hamming equations, the standard parity matrix for the given distance-3 code is defined as follows:

|   | | | | | | | | Position | | | | | | | |
|---|---|---|---|---|---|---|---|---|---|---|---|---|---|---|---|
|   | p1 | p2 | d3 | p4 | d5 | d6 | d7 | p8 | d9 | d10 | d11 | d12 | d13 | d14 | d15 |
| H= | 0 | 0 | 0 | 0 | 0 | 0 | 0 | 1 | 1 | 1 | 1 | 1 | 1 | 1 | 1 |
|    | 0 | 0 | 0 | 1 | 1 | 1 | 1 | 0 | 0 | 0 | 0 | 1 | 1 | 1 | 1 |
|    | 0 | 1 | 1 | 0 | 0 | 1 | 1 | 0 | 0 | 1 | 1 | 0 | 0 | 1 | 1 |
|    | 1 | 0 | 1 | 0 | 1 | 0 | 1 | 0 | 1 | 0 | 1 | 0 | 1 | 0 | 1 |

Columns having only a single entry determine parity positions. This approach assures the independence of the parity equations, yielding the following set:

$p1 = d3 + d5 + d7 + d9 + d11 + d13 + d15$ $p2 = d3 + d6 + d7 + d10 + d11 + d14 + d15$ $p4 = d5 + d6 + d7 + d12 + d13 + d14 + d15$ $p8 = d9 + d10 + d11 + d12 + d13 + d14 + d15$

The decoding of a received data stripe in the vector form $r = (r1, r2, \ldots r15)$ uses the following syndrome equations derived from the corresponding data equations above:

$s1 = r1 + r3 + r5 + r7 + r9 + r11 + r13 + r15$ $s2 = r2 + r3 + r6 + r7 + r10 + r11 + r14 + r15$ $s4 = r4 + r5 + r6 + r7 + r12 + r13 + r14 + r15$ $s8 = r5 + r9 + r10 + r11 + r12 + r13 + r14 + r15$

The syndrome vector obtained from the preceding equation set, written as $s = (s4 + s3 + s2 + s1)$, identifies the partial data position of a single error. Once the error is located, the failing data can be reproduced by solving the original parity equations. This is the standard application of a distance-3 Hamming SEC decoder.

In a RAID application it is possible (and likely) that the location of a failing partial (or partials) will be known due to the previously mentioned internal drive error reporting mechanisms. Knowing the location of the failing data increases the performance of the distance-3 Hamming code in different ways depending upon the error scenario. For example, if a single partial data block is not returned or reported in error, the data can be reconstructed as described above (without the need of solving the syndrome equations). This case is single-error correcting (SEC). If two partial data blocks are not returned or reported in error, the data can be also be reconstructed. Based upon the above matrix above, for any two known bad data partials there exists at least one equation that only contains one of the failing vectors. Solving the corresponding data equation reconstructs that partial, and reduces the syndrome to the preceding case. This case is double-error correcting (DEC).

A third case involves a combination of multiple unknown partials. In this event, the data cannot be corrected. For the case of video (and audio) information, data representing black and/or silence can be inserted. This case is multiple-error detecting (MED). Notwithstanding this last case, advantages of the above-described approach are that double data errors can be corrected, and single, unknown location data errors can also be corrected.

Figure 16:
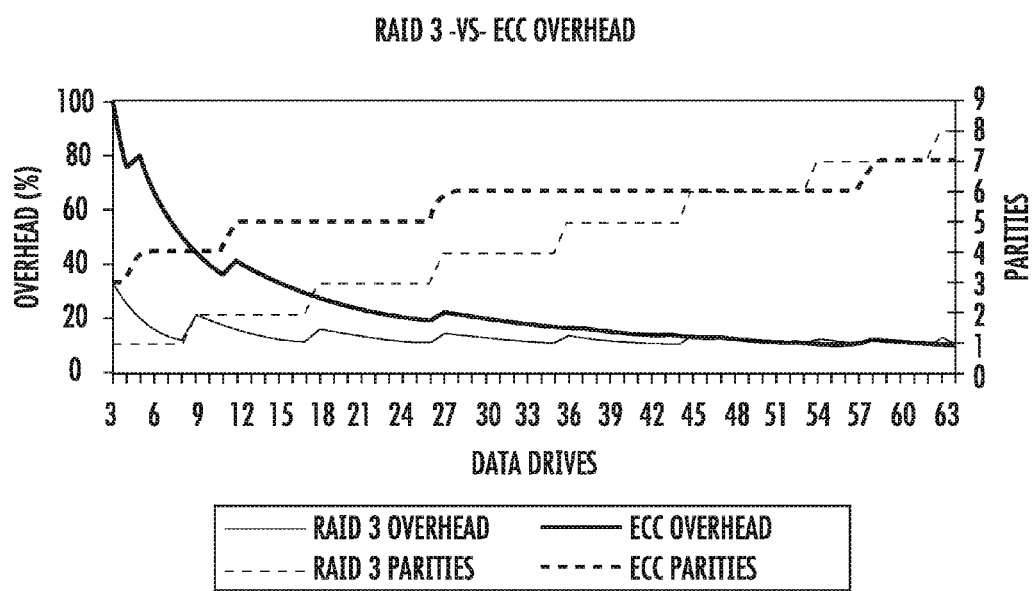
FIG. 16 is a graph comparing RAID 3 vs. ECC overhead for parity configurations that may be implemented in the system of FIG. 1.

Comparing the relative cost of single parity and ECC in terms of additional overhead can be useful in determining which strategy is best suited for the given application. This can be done by comparing the parity overhead of a drive population containing a multiple RAID 3 set to the same population arranged in a single ECC set. The graph of FIG. 16 examines both approaches for an example in which the maximum RAID 3 stripe length is set to 9 drives (8 data+1 parity). As can be seen, ECC systems begin to become advantageous at around 25 drives (data and parity) with an overhead less than twice that of the multiple RAID 3 set. As systems begin to reach 50 drives, the overhead of ECC actually becomes less than that of RAID 3, while continuing a higher level of protection. It should be noted that either of these approaches (or other suitable approaches) may be used at the RAID set level in the system of 30'.

Nonetheless, while localized RAID 3 and ECC protect against drive related media and data errors within a given RAID, data mirroring between different RAIDS affords protection against not only multiple drive errors, but also drive enclosure failures. Although this added layer of redundancy increases the storage system costs (i.e., because it uses an additional RAID set), it significantly increases data survivability and on-air availability. With respect to writing operations, mirroring can be done between two identical RAID 3 or ECC drive sets. Writing is accomplished by sending the data partials and parities to two identical sets of drives D1', D2', which results in the creation of a fully redundant data set, as seen in FIG. 3. It should be noted that by "identical" it is meant that the RAID sets D1', D2' have at least some corresponding drives that are the same, although these RAID sets could have other or extra drives which are not part of the mirror configuration in some embodiments.

Figure 4:
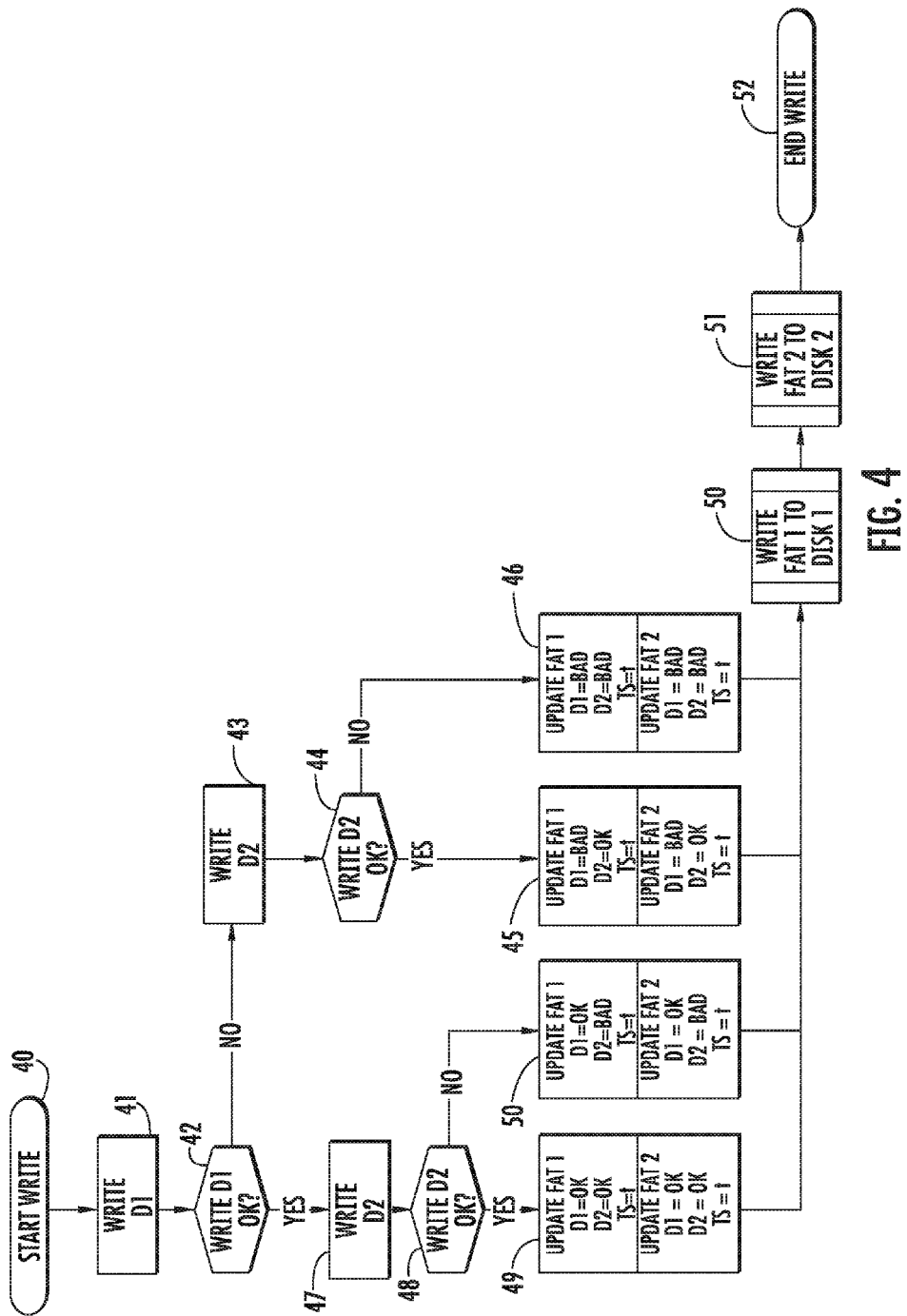
FIG. 4 is a flow diagram illustrating video media data writing operations of the system of FIG. 1.
Figure 5:
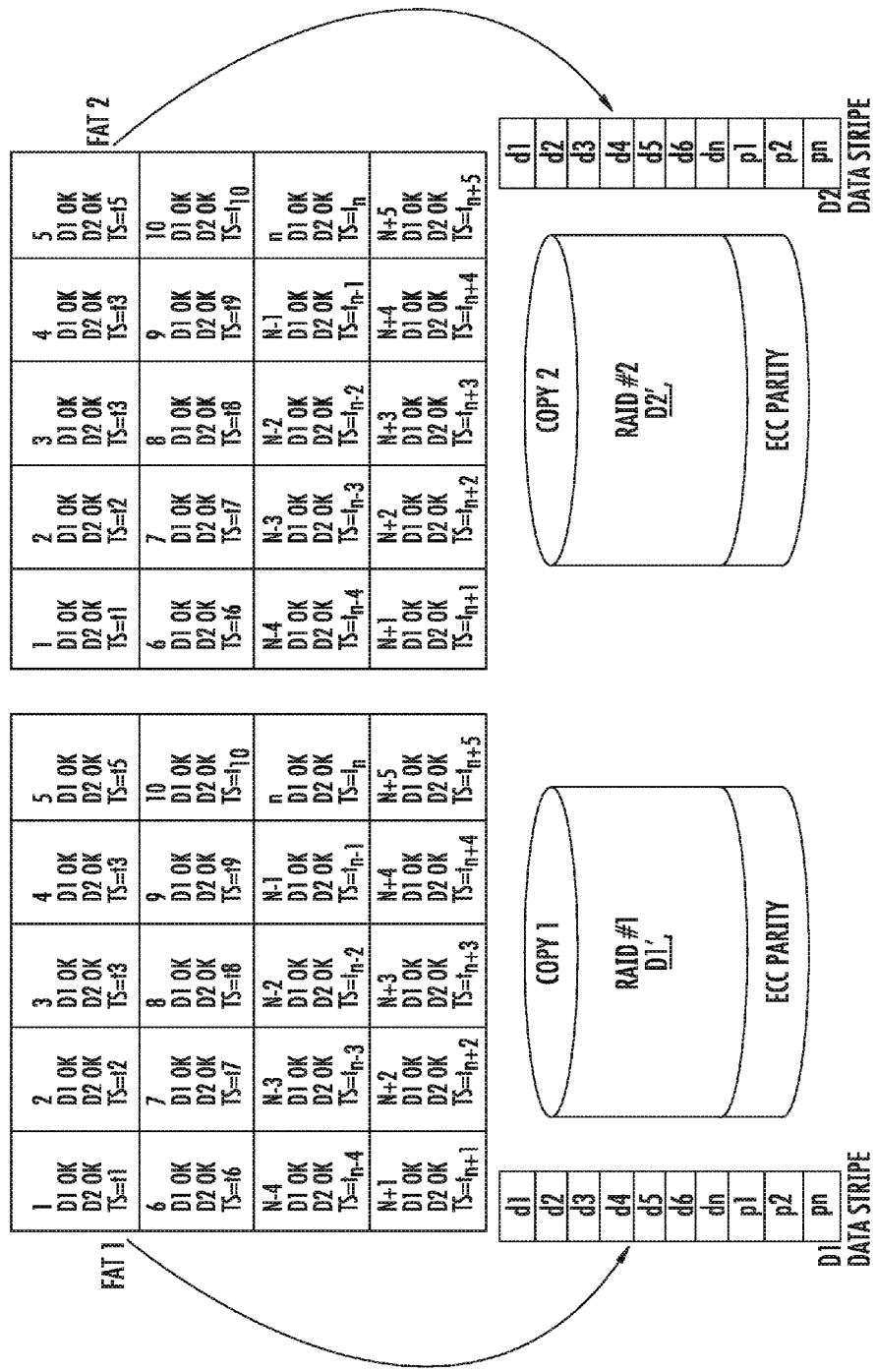
FIG. 5 is a schematic diagram of the first and second pluralities of data storage devices from the system of FIG. 1 with accompanying file allocation tables (FATS) and data stripes.

Turning now to FIGS. 4 and 5, an exemplary write flow process by the memory controller(s) 31 is described. Beginning at Block 40, the memory controller(s) 31, initially attempts to write the video media data stripe to one of the RAID data sets (D1 in the present example), at Block 41. If writing to the RAID set D1 cannot be completed successfully, such as due to a drive fault, etc., at Block 42, then the memory controller(s) 31 attempts to write the video media data stripe to the second RAID set D2, at Block 43. If this is successful, then the memory controller(s) 31 updates the FAT tables to indicate the RAID data set D1 storage device(s) that is bad, and that the RAID data set D2 is ON, at Block 45, and to write a time stamp TS indicating the time of writing. Otherwise, both of the RAID sets D1 and D2 have one or more bad storage devices/sectors, and the first and second FATS are updated accordingly, at Block 46.

If writing to the RAID data set D1 is initially successful (Block 42), then the mirrored writing to the RAID data set D2 is attempted, at Block 47, and the memory controller(s) 31 determines whether this writing operation is successful, at Block 45. The first and second FAT tables are updated accordingly for the case where the write operation to the RAID set D2 was successful (Block 49), and where it was not (Block 50), as described above. At this point, the memory controller(s) 31 writes the first and second FAT tables to their respective first and second RAID sets D1, D2, at Blocks 50-51, thus concluding the illustrated writing operations (Block 52).

Exemplary FATs for a mirrored RAID set configuration are shown in FIG. 5. Since a likely failure scenario involves not only write failures but also the possibility of loss of an entire RAID set, it is desirable to protect against these failure modes. The FATs for each RAID set D1, D2 advantageously include sector indexing information, timestamps, and data OK flags for both of the RAID sets, as seen in FIG. 5. If a write fails on either side of the mirror (i.e., in either RAID set), the corresponding data OK flags in both FATS are cleared. This way subsequent reads will know to ignore these data elements, as discussed further below.

One particularly advantageous feature of the writing/reading/recovery operations described herein is that they may be implemented using a software application running at the memory controller/sever. Once suitable software application that may be used to implement the approach described herein is the RAIDSoft application from Harris Corporation. The parity operations/calculations are performed by the memory controller(s) 31, and the data and localized parity are then written in a mirrored fashion to both of the RAID sets D1, D2, as discussed above. All of the information is mirrored at the block level, with the exception of the FAT tables. The FAT tables differ between the two RAID sets D1, D2 to track bad sectors/drives and offline conditions. The FAT information for both RAID sets D1, D2 may also be stored in a memory such as a random access memory (RAM) in some embodiments as well to provide faster operation by the memory controller(s) 31.

Figure 6:
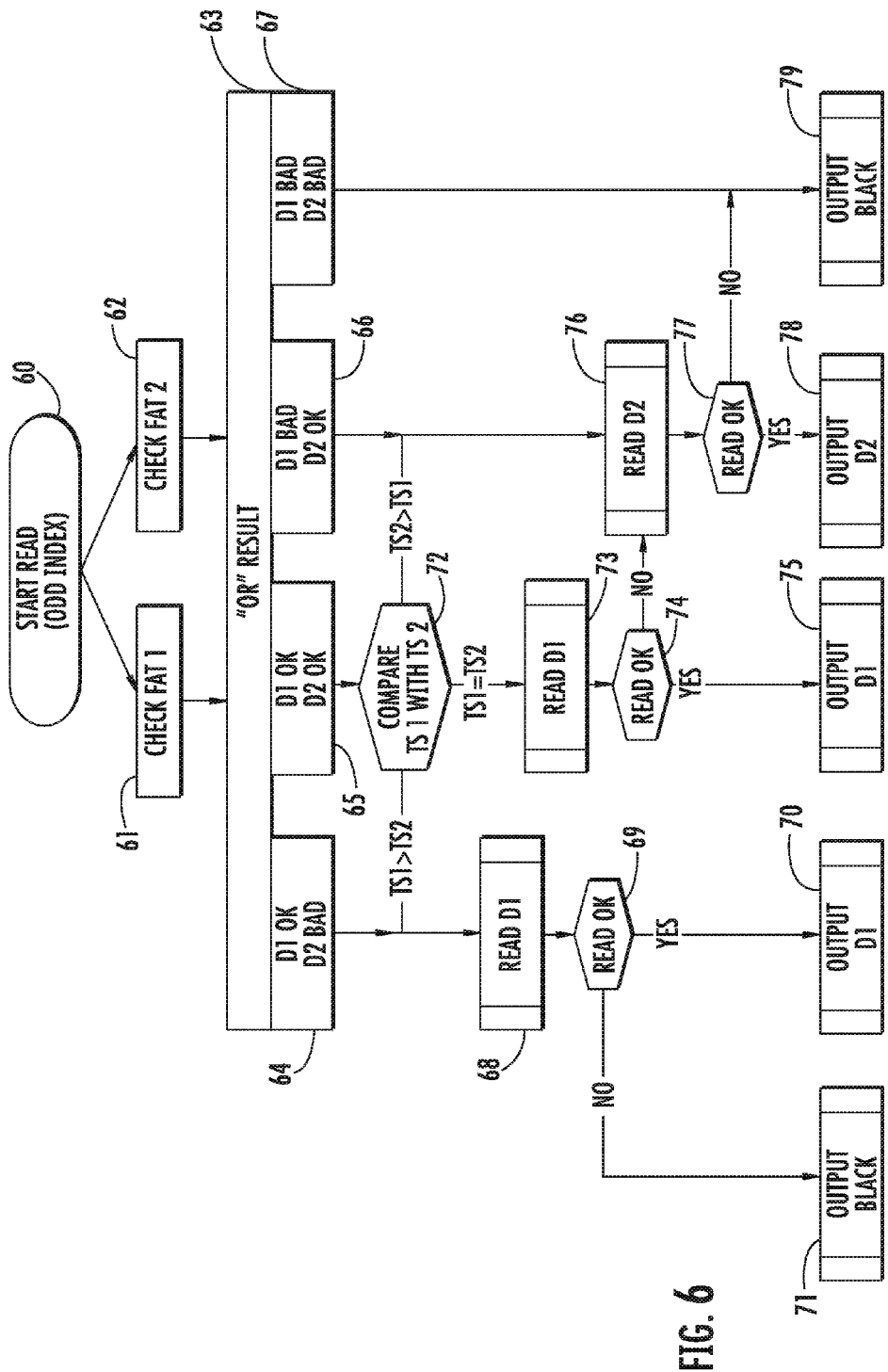
FIG. 6 is a flow diagram illustrating video media data reading operations of the system of FIG. 1.
Figure 7:
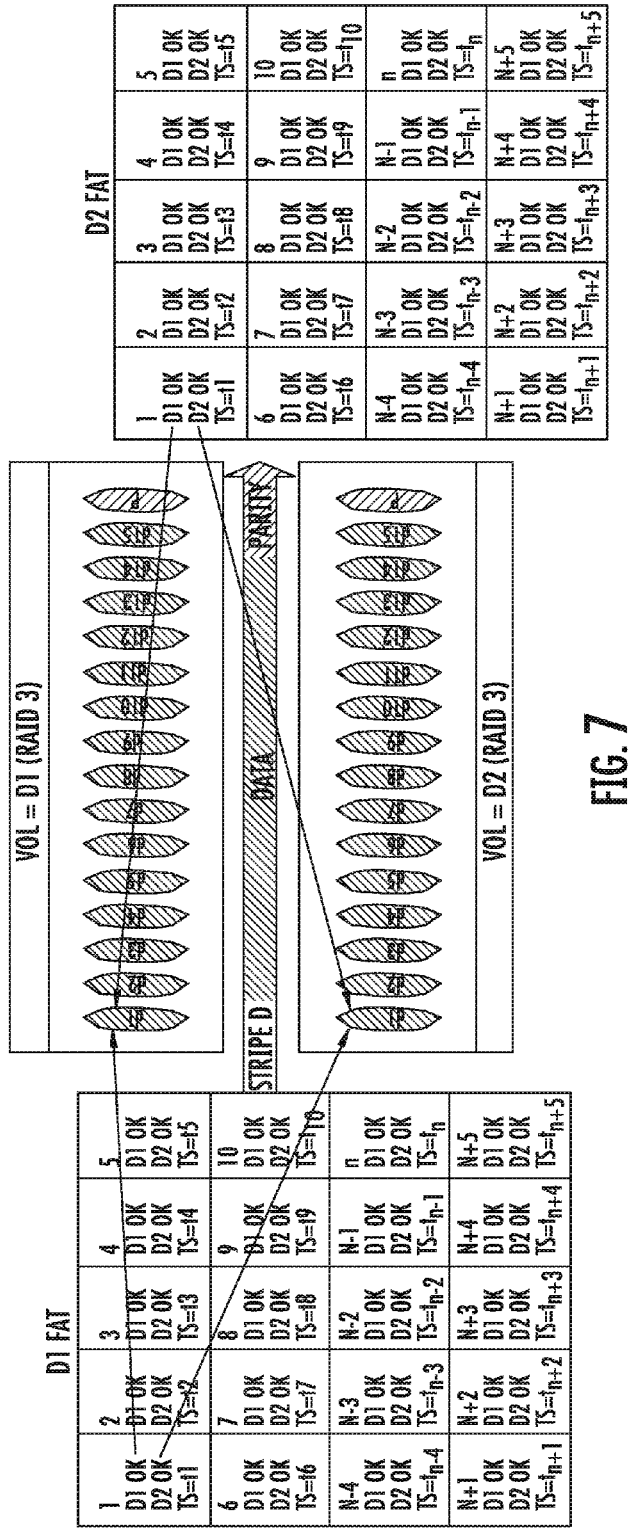
FIG. 7 is a RAID map of the first and second pluralities of data storage devices of the system of FIG. 1 and their associated FAT tables.
Figure 9:
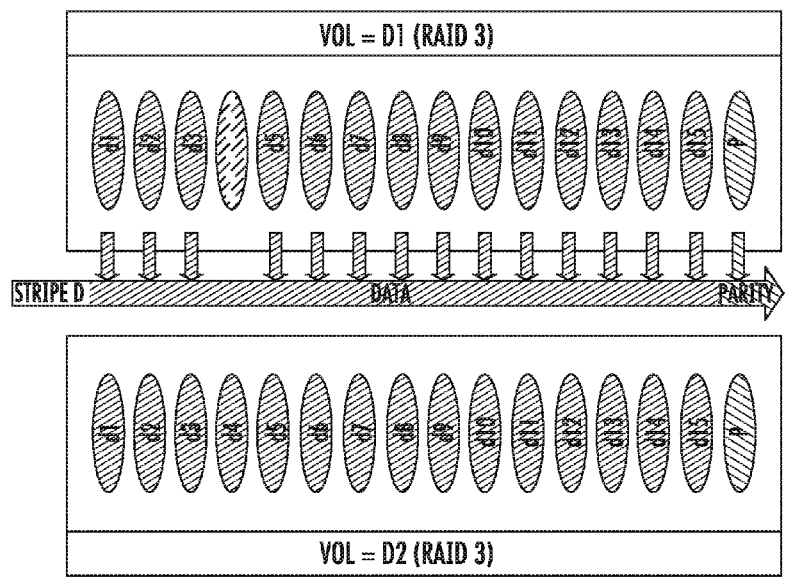
FIGS. 9-13 are RAID drive maps illustrating various video media data recovery scenarios of the system of FIG. 1.
Figure 10:
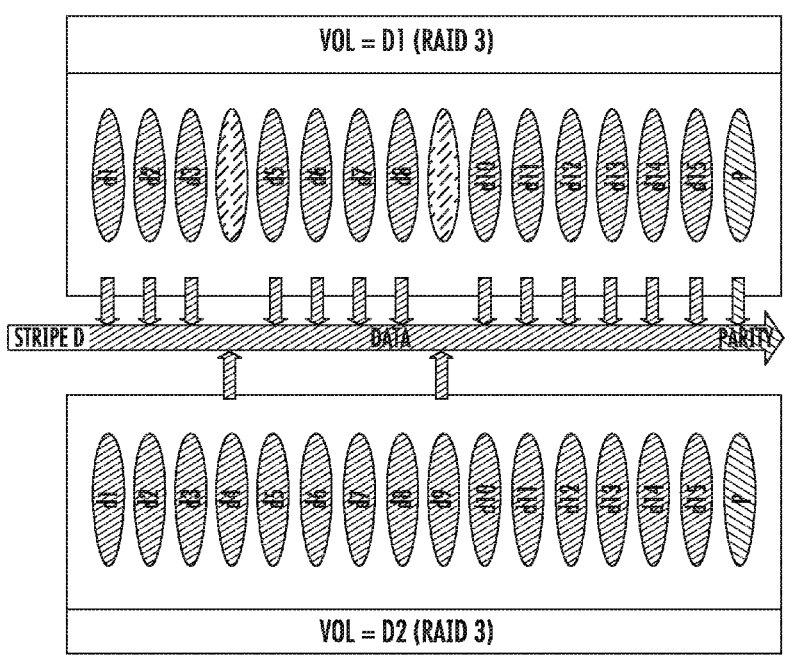

Turning now additionally to FIGS. 6 and 7, the reading process will now be described. Generally speaking, data reads are performed once and load balanced between the first and second RAID sets D1, D2 if both sets contain good (i.e., without fault and/or up-to-date) data. Unrecorded or faulty sectors/drives are noted in the FATS and not used in read operations. If the load balanced read returns an error, then the other copy of the data is immediately read with little or no disturbance to air playout in broadcast scenarios, for example. In the case of a RAID set being down, the down set will not be accessed again until the problem is cleared (e.g., drive replaced, etc.). Probe commands may be periodically sent to determine when the down set returns to operations, for example, as will be appreciated by those skilled in the art.

More particularly, beginning at Block 60, when performing a read operation the memory controller(s) 31 first checks the first and second FAT tables to see if the data is good for a given block of data in both of the first and second RAID sets D1, D2 (Blocks 61, 62), as illustrated in FIG. 7. The results of the FAT tables are compared, such as through a logical OR operation (Block 63), to determine the four possible fault conditions for the drives in questions, namely: (a) the RAID set D1 is OK but RAID set D2 is BAD (Block 64); (b) both RAID sets are OK (Block 65); (c) RAID set D1 is BAD but RAID set D2 is OK (Block 66); and (d) both RAID sets are bad for the given block of data (Block 67).

In the first case (a), the memory controller(s) 31 attempts to read the first RAID set D1, at Block 68, and if the read is completed successfully (Block 69) then the data is output accordingly, at Block 70. If the read operation is not successful for whatever reason, then black and/or silence may be output, at Block 71. In the second case (b), since both RAID sets are OK (i.e., without fault), then the memory controller(s) 31 checks to see which RAID set D1, D2 has the most up-to-date data (i.e., compares the time stamps), at Block 72. If the time stamp for the RAID set D1 time stamp is more recent, then the memory controller 31 reads the first RAID set as described above at Blocks 68-71.

If the time stamps are the same, then the memory controller(s) 31 may read from either RAID set D1, D2, and the choice between the two may be based upon a load balancing algorithm (i.e., checks which one is busiest at the time and uses the other), and/or a preferential (i.e., default) scheme may be used. For example, in the illustrated embodiment an affinity is given to odd or even RAID sets, such that odd-numbered memory controllers (e.g., controller #1) would first access an odd-numbered RAID set (i.e., RAID set D1), and vice-versa. In the present example, the affinity is for the first RAID set D1, which the memory controller(s) 31 attempts to read at Block 73. If the read is successful, at Block 74, then the data is output (Block 75). If not, the memory controller(s) 31 still has the option of reverting back to the second RAID set D2. If the attempted read from the second RAID set D2 is successful, at Blocks 76-77, then the data is output, at Block 78. Otherwise, black and/or silence data is output, at Block 79.

For the third case (c), the memory controller(s) 31 attempts to read from the second RAID set D2 in the same manner described above with reference to Blocks 76-79. For the final case (d) where both RAID sets D1, D2 have faults, etc., then black and/or silence data is output, at Block 79. In the exemplary embodiment shown in FIG. 7, all of the drives are without fault and have equal time stamps (meaning both sets have the freshest or most up-to-date data). It should be noted that in some embodiments reading may also be performed from a faulty drive using the parity data described above if the mirrored data is bad or "stale", as will be appreciated by those skilled in the art, although this is not illustrated in FIG. 6 for clarity of explanation. Typically this option is available if a single drive within a RAID set is faulty but the rest are not. That is, as the number of faulty drives increases past one, the less likely it will be that intra-RAID set parity can be used to read and/or recover this data, as will be appreciated by those skilled in the art. This is why the mirrored writing/reading/recovery operations are particularly advantageous where high throughput and availability are required of the system 30.

Referring now additionally to FIGS. 8A-8C, the above-described reading operations will be further understood with reference to an exemplary read scenario. For the first block of data (stored on drive d1 in both RAID sets D1, D2), it can be seen in the operation table of FIG. 8 that both FATs reflect that drive d1 is OK in both RAID sets, and that their time stamps are equal. Thus, both data stripes have "good" data and either can be successfully read based upon affinity, load balancing, etc. In the case of the second data block, both FATS indicate that the drive d2 is OK in the first RAID set D1, but the second FAT indicates that the drive d2 in the second RAID set D2 is bad, and that the time stamp for drive d1 in RAID set D1 is newer than for the drive d2 of the second RAID set D2. As such, only the first data stripe (i.e., RAID set D1) is considered valid for reading.

For the fourth data block, the drive d4 is listed as bad in the second FAT table, and the time stamp for the drive d4 in the second FAT is also newer. As such, the first data stripe is again considered bad, and the second data strip (i.e., RAID set D2) is read. For the seventh data block, both FAT tables indicate that the RAID sets D1 and D2 are OK, but the time stamp for the drive d7 of the second RAID set is newer, indicating that the data on the drive d7 of the first RAID set is stale. Accordingly, the memory controller(s) 31 considers the first data stripe to be old or stale, and reads from the drive d7 of the second RAID set. In the last illustrated case for the ninth data block, both FAT tables indicate that the RAID sets D1 and D2 are OK, but the time stamp for the drive d7 of the first RAID set is newer, indicating that the data on the drive d7 of the second RAID set is stale. Accordingly, the memory controller(s) 31 considers the second data stripe to be old or stale, and reads from the drive d7 of the first RAID set.

Referring now to FIGS. 9-13 and FIG. 15, the data recovery steps performed by the memory controller(s) 31 are now further described. Generally speaking, in cases where both RAID sets are available, all unused, bad, or out of sync sectors on all disks will be written with recovered data. The recovered data is preferably always the "freshest" copy, taken from whichever RAID set D1, D2 is appropriate. If the freshest data had a read fault from an individual disk, then the inter-RAID set mirror data is used to recover the data.

More particularly, beginning at Block 150, the parity data is generated for the first and second RAID sets D1, D2 as discussed above (Block 150). In particular, the parity data may be generated for one of the RAID sets D1, D2, and then copied over as part of the mirrored data set, although in some embodiments parity data could be generated independently for each of the RAID sets, if desired. The memory controller(s) 31 determines which of the storage devices in the first and second RAID sets require recovery or data freshening, at Block 152, based upon the OK flags and the time stamps, for example.

The way in which the memory controller(s) will perform data recovery will depend upon the number of storage devices/drives that are affected. More particularly, if only a single drive in one of the RAID sets D1 or D2 is affected, the data is recovered on the fly from the intra-RAID set parity data, at Block 154, thus concluding the illustrated example (Block 155). In the example shown in FIG. 9, the drive d4 in the RAID set D1 is bad (or has stale date), as indicated by the dashed markings. Here, the data may be recovered using the parity data stored in the drive P in the first RAID set, and thus it is not necessary to go to the mirrored data in the second RAID set D2 for recovery (although this could be done, if desired).

In the case of a bad drive, the user would replace the bad drive and the recovery operations may advantageously be performed automatically by the memory controller(s) 31 once it detects that the drive is no longer faulty, for example. It should be noted that even if the corresponding partials from both RAID sets D1, D2 are damaged, parity data from either set can be used to reconstruct the data buffer.

However, if more than a single drive is affected, depending upon the particular scenario, inter-RAID recovery will be used in addition to, or instead of, the intra-RAID parity-based recovery, at Blocks 156-157. In the example illustrated in FIG. 10, two drives in the first RAID set D1 are bad or have stale data, namely the drives d4 and d9. Here, the memory controller(s) 31 uses the mirrored data from the corresponding drives d4 and d9 in the second RAID set D2 to recover the data to the drives d4 and d9 of the first RAID set D1, which again may advantageously be done on the fly without disruption to air time.

Figure 11:
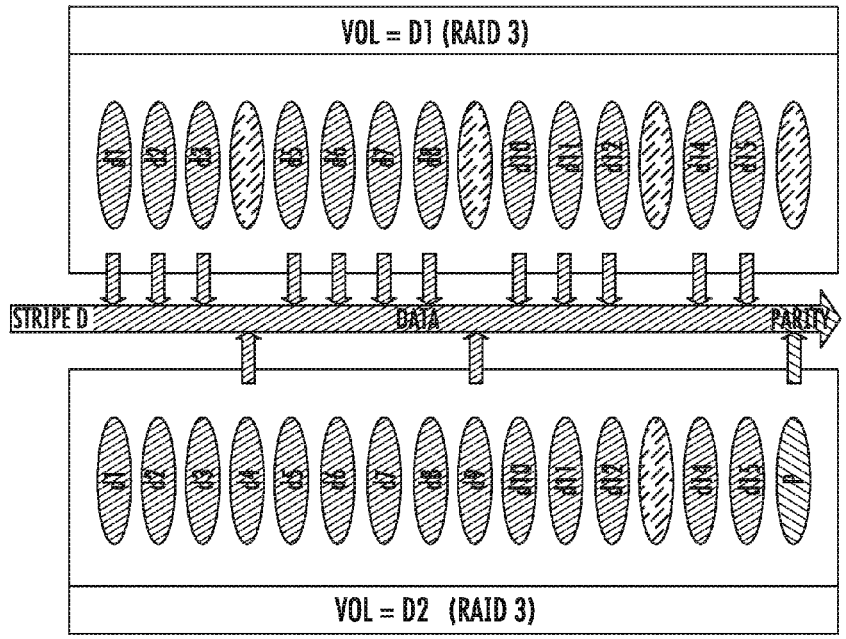

A more extended disk failure scenario is shown in FIG. 11, where multiple drives in the first RAID set D1 have failed (i.e., the drives d4, d9, d13, and P), and the corresponding disk d9 in the second RAID set also fails. Here, the data in the drive d9 of the second RAID set D2 is recovered using the inter-RAID parity data from its drive P, and the faulty drives in the first RAID set D2 (i.e., the drives d4, d9, d13, and P) may then be recovered using the data from the corresponding drives in the second RAID set. This can still advantageously be performed by the memory controller(s) 31 on the fly and without disruption to air.

Figure 12:
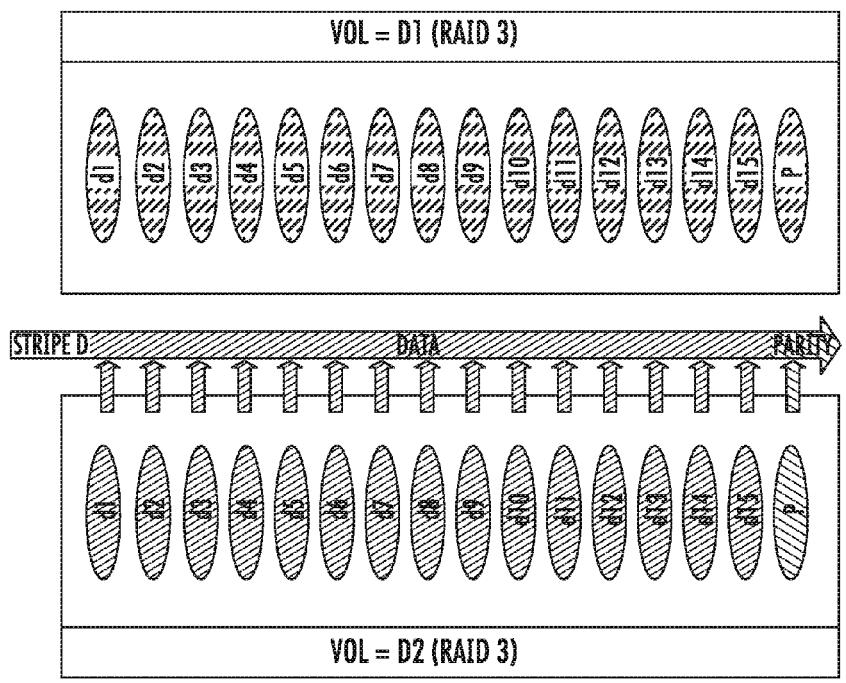
Figure 13:
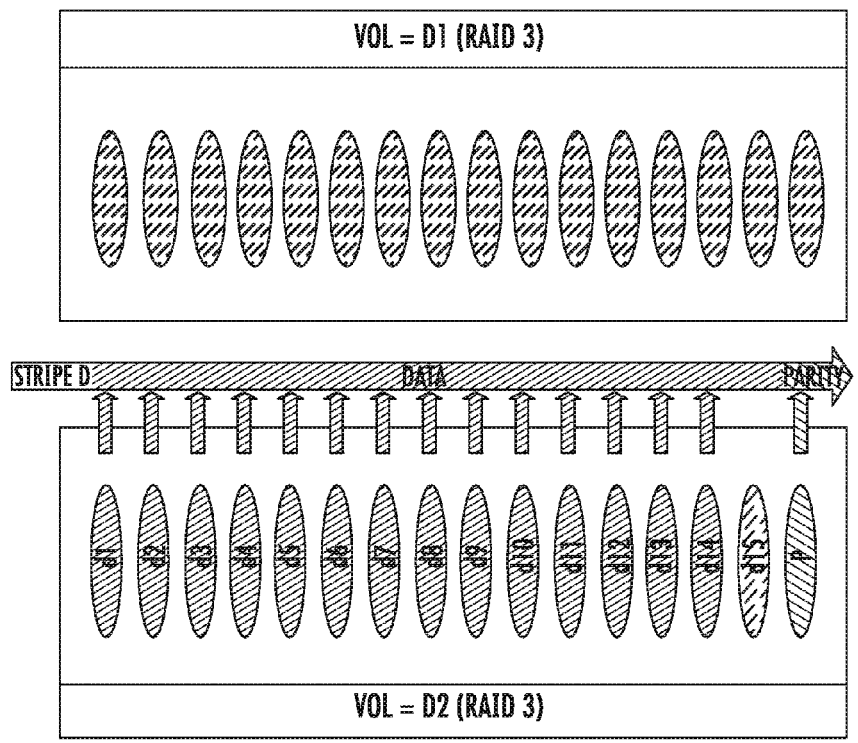

Still another fault scenario is illustrated in FIG. 12, where the entire RAID set D1 goes down for some period of time. By way of example, this could happen when an FC cable is unplugged from a memory controller/server, drive chassis, or switch. This could also happen where an FC switch is accidentally unplugged or fails, or where a drive chassis loses power or fails, as will be appreciated by those skilled in the art. In such case, the memory controller(s) 31 will lose access to the first RAID set D1, but it will still advantageously be able to read and write from the second RAID set D2 with little or no effect to the output video stream. In this situation, sectors written by the affected servers (e.g., the server 31a' in FIG. 2) are remembered as bad in the FAT of the opposite RAID set, and therefore will not be used in subsequent read operations by any server. Once power/connection to the affected RAID set is restored, then the memory controller(s) performs data recovery from the mirrored data in the RAID set D2 to the corresponding drives in the RAID set D1.

Thus, it will be appreciated that with a mirrored RAID 3 (or higher) set as discussed above, loss of all the partial elements (i.e., individual drives) in one of the RAID sets as well as the loss of an additional single drive in the other RAID set can be recovered. Mirrored ECC RAID sets can advantageously recover from loss of an entire RAID set as well as the loss of two additional elements on the other RAID sets in some situations. If an entire RAID set is not available, as in the prior example, when it is returned to service it is likely that it will contain stale data elements. By comparing timestamps during reading, stale data elements can likewise be ignored. This may be done by ORing together the corresponding data values and comparing the timestamps, for example.

Many modifications and other embodiments of the invention will come to the mind of one skilled in the art having the benefit of the teachings presented in the foregoing descriptions and the associated drawings. Therefore, it is understood That which is claimed is:

1. A video media data storage system comprising:
first and second pluralities of data storage devices each arranged in a redundant array of independent drives (RAID) configuration and configured to write and read video media data corresponding to a video stream; and
at least one memory controller coupled to said first and second pluralities of data storage devices and configured to
perform mirrored writing of video media data to both said first and second pluralities of data storage devices,
generate respective first and second file allocation tables (FATS) including video media data time stamps and validity information for both of said first and second pluralities of data storage devices, and
selectively read video media data from both of said first and second pluralities of data storage devices during a playback of the video stream to avoid faulty or outdated video media data on said first and second pluralities of data storage devices based upon the first and second FATs.

2. The video media data storage system of claim 1 wherein said at least one memory controller is also configured to perform data recovery between said first and second pluralities of data storage devices from the mirrored video media data based upon the first and second FATs.

3. The video media data storage system of claim 2 wherein said at least one memory controller is configured to write the video media data in each of said first and second pluralities of data storage devices as striped video media data; wherein said at least one memory controller also is configured to generate parity data from the striped video media; and wherein said at least one memory controller also is also configured to perform data recovery within a given one of the first and second pluralities of data storage devices based upon the parity data.

4. The video media data storage system of claim 3 wherein said at least one memory controller is configured to select between using the mirrored video media data and the parity data for performing data recovery based upon a number of data storage devices having faults within the given one of said first and second pluralities of data storage devices.

5. The video media data storage system of claim 1 wherein said at least one memory controller is configured to perform load balancing to read the video media data from said first and second pluralities of data storage devices.

6. The video media data storage system of claim 1 wherein said first and second pluralities of data storage devices are each arranged in a RAID 3 or higher configuration.

7. The video media data storage system of claim 1 wherein said at least one memory controller comprises a first memory controller for the first plurality of data storage devices, and a second memory controller for the second plurality of data storage devices.

8. The video media data storage system of claim 7 further comprising first and second fibre channel (FC) switches respectively coupling said first and second memory controllers to said first and second pluralities of data storage devices; wherein the first memory controller is coupled to said second FC switch; and wherein the second memory controller is coupled to said first FC switch.

9. The video media data storage system of claim 1 wherein said first and second pluralities of data storage devices and said at least one memory controller are connected together in a storage area network (SAN).

10. The video media data storage system of claim 1 wherein said at least one memory controller comprises at least one broadcast video server.

11. A video media data storage system comprising:
first and second pluralities of data storage devices each arranged in a redundant array of independent drives (RAID) configuration and configured to write and read video media data corresponding to a video stream; and
at least one memory controller coupled to said first and second pluralities of data storage devices and configured to
perform mirrored writing of video media data to both said first and second pluralities of data storage devices,
generate respective first and second file allocation tables (FATs) including video media data time stamps and fault information for both of said first and second pluralities of data storage devices,
selectively read video media data from both of said first and second pluralities of data storage devices during a playback of the video stream to avoid faulty or outdated video media data on said first and second plurality of data storage devices based upon the first and second FATs, and
performing data recovery between said first and second pluralities of data storage devices from the mirrored video media data based upon the first and second FATs.

12. The video media data storage system of claim 11 wherein said at least one memory controller is configured to write the video media data in each of said first and second pluralities of data storage devices as striped video media data; wherein said at least one memory controller also is configured to generate parity data from the striped video media; and wherein said at least one memory controller also is configured to perform data recovery within a given one of the first and second pluralities of data storage devices based upon the parity data.

13. The video media data storage system of claim 12 wherein said at least one memory controller is configured to select between using the mirrored video media data and the parity data for performing data recovery based upon a number of data storage devices having faults within the given one of said first and second pluralities of data storage devices.

14. The video media data storage system of claim 12 wherein said at least one memory controller is configured to perform load balancing to read the video media data from said first and second pluralities of data storage devices.

15. The video media data storage system of claim 12 wherein said first and second pluralities of data storage devices are each arranged in a RAID 3 or higher configuration.

16. The video media data storage system of claim 12 wherein said at least one memory controller comprises a first memory controller for said first plurality of data storage devices, and a second memory controller for said second plurality of data storage devices.

17. The video media data storage system of claim 12 wherein said at least one memory controller comprises at least one broadcast video server.

18. A video media data storage method comprising:
providing first and second pluralities of data storage devices each arranged in a redundant array of independent drives (RAID) configuration for permitting writing and reading of video media data corresponding to a video stream;

performing mirrored writing of video media data to both the first and second pluralities of data storage devices;

generating respective first and second file allocation tables (FATS) including video media data time stamps and validity information for both of the first and second pluralities of data storage devices; and selectively reading video media data from both of the first and second pluralities of data storage devices during a playback of the video stream to avoid faulty or outdated video media data on the first and second pluralities of data storage devices based upon the first and second FATs.

19. The method of claim 18 further comprising performing data recovery between the first and second plurality of data storage devices from the mirrored video media data based upon the first and second FATs.

20. The method of claim 19 wherein performing mirrored writing comprises writing the video media data in each of the first and second pluralities of data storage devices as striped video media data; and further comprising:

generating parity data from the striped video media; and performing data recovery within a given one of the first and second pluralities of data storage devices based upon the parity data.

21. The method of claim 20 further comprising selecting between using the mirrored video media data and the parity data for performing data recovery based upon a number of data storage devices having faults within the given one of the first and second pluralities of data storage devices.

22. The method of claim 18 wherein selectively reading comprises performing load balancing to read the video media data from the first and second pluralities of data storage devices.

23. The method of claim 18 wherein the first and second pluralities of data storage devices are each arranged in a RAID 3 or higher configuration.

* * * * *